United States Patent Office 2,940,939
Patented June 14, 1960

2,940,939

PROCESS OF PREPARING SILICA SOLS

Ernst Podschus and Werner Joseph, Leverkusen, Germany, assignors to Farbenfabriken Bayer Aktiengesellschaft No Drawing. Filed Nov. 25, 1957, Ser. No. 698,372

Claims priority, application Germany Dec. 10, 1956

7 Claims. (Cl. 252—313)

The present invention relates to the preparation of silica sols. More particularly, the instant discovery concerns the preparation from water glass of silica sols of high $SiO_2$ concentrations.

Commercial water glass having the composition $Na_2O(SiO_2)_{3.3}$ has generally been used as a starting material for the preparation of silica sols. One method of preparing water glass of the type just mentioned comprises melting quartz sand with sodium carbonate. Still another method involves melting quartz sand with sodium sulfate and carbon. Water glass thus produced contains traces of foreign salts, chiefly sodium chloride and sodium sulfate, which originate, respectively, from the sodium carbonate and sodium sulfate.

According to J. G. Vail in "Soluble silicates," published in 1952 by Reinhold Publishing Corporation, New York, N.Y., an average water glass prepared from sand and sodium carbonate and comprising about 65 percent $SiO_2$ by weight may contain about 0.14 percent NaCl by weight and 0.11 percent $Na_2SO_4$ by weight. Technical water glass prepared by the sulfate process defined above and comprising 27 percent $SiO_2$ by weight may contain about 0.5 percent $Na_2SO_4$ by weight and 0.1 percent NaCl by weight. On the other hand, technical water glass prepared by the sodium carbonate process above defined may contain 0.05 percent by weight $Na_2SO_4$ and 0.07 percent NaCl.

When solutions of water glass of the type herein contemplated are diluted to about 6 percent $SiO_2$ by weight and passed through a column containing ion exchange resin in the hydrogen ion form, an acidic silica sol is obtained, its pH value depending upon the sulfate and chloride content of the water glass employed and on the flow rate through the ion exchange layer, i.e., on the degree of exchange of $Na^+$ for $H^+$ ions.

Fresh acidic sol thus produced exhibits pH values between about 1.5 and 3.5 and has only limited stability on storage. Stabilization of the sol may be effected by adding it to a hot sol or to water which has been adjusted to a pH of about 8 or 9 by the addition of NaOH, for example. The resulting sol having a pH of about 8 is then evaporated until the desired $SiO_2$ concentration is realized.

When water glass produced from a sulfate process is employed in the aforedescribed sol-forming process, a stable sol having an $SiO_2$ content of up to only about 15 percent by weight can be realized. On the other hand, when water glass produced by a sodium carbonate process is employed, a sol containing up to only about 30 percent $SiO_2$ by weight may be produced. When higher $SiO_2$ concentrations are sought in these sols, gelling slowly occurs.

Up to the present time, therefore, an additional working step has been required for the production of sols of higher $SiO_2$ content. For example, sols prepared as above could be treated with an ion exchange resin in the hydroxyl form, i.e., an $OH^-$ ion exchanger, either immediately following the treatment with an ion exchange resin in the hydrogen form, whereupon the sol must be stabilized very quickly, or after previous stabilization by heating the sol which has been rendered weakly alkaline.

Since ion exchange resin in the hydroxyl form is much more difficult to regenerate than ion exchange resin in the hydrogen form, this additional working step is not desirable. The regeneration problems render the process cumbersome and tedious.

According to the present invention, however, stable silica sol having an $SiO_2$ concentration of more than 30 percent by weight is obtainable from water glass solutions by the simple addition to a sol of lower concentration of an only slightly water-soluble compound capable of forming only slightly water-soluble sulfates with the $SO_4^{--}$ content of the sol. For example, technical water glass solutions of relatively high electrolyte content, water glass solutions from the sulfate melt, and the like, may be treated as herein contemplated with an ion exchange resin in the hydrogen form to produce the above-identified lower concentration sols and these sols, in turn, treated as herein contemplated with only slightly water-soluble compounds, such as barium carbonate, lead carbonate, lead oxides, benzidine, and the like, which compounds are capable of forming only slightly water-soluble sulfates with the $SO_4^{--}$ content of the sols. Generally, no more than a stoichiometric amount of the only slightly water-soluble, sulfate-precipitating additive is added to the sol, based upon the $SO_4^{--}$ concentration thereof.

During this treatment, the pH of the sols increases according to the degree of removal of $SO_4^{--}$ in the sols. Preferably, the pH should not be allowed to approach the neutral point too closely, in view of a tendency of the sols to gel at the neutral point. The stability of the resulting very fine fresh sol contemplated herein is dependent upon its diluteness and acidity. Thus, the highest permissible pH value is contingent upon the particle size of the $SiO_2$ and on its concentration in the sol.

For example, a sol containing 6 percent $SiO_2$ by weight and having a pH value of about 2, which sol has been prepared from sulfate-water glass, is preferably maintained at a pH of 3 or under during the described treatment. For a more concentrated sol the desirable pH limit is correspondingly lower and for a more dilute sol correspondingly higher.

The relatively fine-grained sulfate resulting from the above-described treatment may either be immediately separated from the sol or it may be left therein and separated after a stabilization step. On the other hand, it may be removed by sedimentation after evaporation.

Silica sols which have been treated with sulfate-precipitating additives as hereinabove disclosed, which sols are thus rid of a substantial portion of their $SO_4^{--}$ ions, may then be added to hot sols as described above and concentrated. For instance, a hot sol adjusted to a pH of about 8 or 9 by the addition of sodium hydroxide may be admixed with the freshly-made sol and the resulting mixture continuously evaporated by continuously introducing more fresh sol as needed and sufficient sodium hydroxide to maintain the pH relatively constant. Simultaneously, concentrated sol is withdrawn. By rapidly adding fresh sol to hot, weakly alkaline sol before evaporation, a batch process can be effected.

Among the many advantages resulting from the present invention is the fact that the burdensome problems resulting from the use of ion exchange resins in the hydroxyl form are eliminated. Furthermore, silica sols containing better than 30 percent $SiO_2$ by weight may be produced from sulfate-melt water glass as well as sodium carbonate-melt water glass. As stated above, previously sols containing only 15 and 30 percent $SiO_2$ by weight could be produced without additional treatment with an ion exchange resin in the hydroxyl form.

In view of the fact that the sulfate-precipitating additives used herein are useless when added to the water glass solution before treatment with a H+ ion exchanger, the results achieved by the present invention are surprising and unexpected. The additives are much less effective in a later stage of the process, unless the sol is first stabilized without any substantial evaporation taking place, then, when weakly alkaline, passed once again through the H+ ion exchanger and finally treated with the sulfate-precipitating additives. Obviously, this process is more cumbersome.

The sulfate precipitation is also unsuccessful if, instead of barium carbonate, for example, soluble barium hyroxide is added to the silicate solution. Moreover, the addition of $Ba(OH)_2$ to the fresh acid sol instead of the additives herein contemplated creates difficulties, since $Ba(OH)_2$ flocculates the silica.

It is of great significance that silica sols prepared by the process of the present invention are more readily and less expensively transported than sols of lesser $SiO_2$ concentrations and substantially great bulk or volume. Moreover, sols of high $SiO_2$ concentrations are preferred in many commercial applications for obvious reasons.

Silica sols have many uses. Typical of these is their use in plastics to impart such properties as higher melting temperatures, improved dielectric strength, rigidity, and the like. The sol solution may be admixed with water-immiscible organic compounds, such as benzene, toluene or petroleum hydrocarbons, whereupon silica in colloidal form transfers to the nonaqueous layer and by such means may be introduced into plastics.

The present invention is best illustrated by reference to the following examples which, although detailed, are not intended to exert any undue limitations upon the breadth of the discovery:

Example I

Commercial water glass having the composition $Na_2O(SiO_2)_{3.3}$ and containing 27 percent $SiO_2$ by weight, which water glass was produced by the sodium sulfate process, was diluted with distilled water to give a sodium silicate solution containing 60 grams of $SiO_2$ per liter. Five liters of this solution was passed through an ion exchange column filled with a sulfonated, cross-linked polystyrene resin in the hydrogen ion form, the solution passing from top to bottom in the column. Subsequently, the column was rinsed with distilled water. About 6.5 liters of a sol with an $SiO_2$ content of about 5 percent by weight and having a pH of about 2.3 was obtained. A sample thereof was analyzed for its acid content and it was determined that 0.16 gram of $H_2SO_4$ and 0.05 gram of HCl were present per liter of the sol.

Pursuant to this determination, 0.322 gram of $BaCO_3$ was added per liter of sol. This amount corresponding to the $H_2SO_4$ content of the sol was added as an aqueous suspension with stirring and it increased the pH value of the sol to 2.8. $BaSO_4$ thus formed by reaction of $BaCO_3$ with $H_2SO_4$ was removed by filtration.

The substantially $SO_4^{--}$-free silica sol which resulted was diluted with water to give twice the original quantity, adjusted to a pH of 8 by the addition of NaOH and heated to boiling. To this sol further quantities of substantially $SO_4^{--}$-free, fresh sol prepared in the aforedescribed manner were gradually added in portions of about 6.5 liters each while heating to boiling temperature, evaporating and maintaining a pH of about 8 by the addition of NaOH.

After the addition of 22 such portions, 26 kilograms of a 25.2 percent $SiO_2$ by weight sol having a pH of 7.8 was obtained. The specific surface area of the silica obtained by drying the sol at 105° C. was 140 square meters per gram, as determined by the Brunauer-Emmett-Teller method described in the Journal of the American Chemical Society, volume 60, page 309 (1938). A sample of this same sol was acidified by another treatment with an ion exchange resin in a hydrogen form and dried as above. The specific surface area thereof was 158 square meters per gram.

The yield of silica obtained was about 95 percent by weight, basis the $SiO_2$ content of the original water glass solution. The quantity of NaOH added corresponded to an $NaOH:SiO_2$ molar ratio of 1:170. Finally, the sol thus obtained containing 25.2 percent $SiO_2$ by weight was further evaporated to a concentration of 36 percent $SiO_2$ by weight, at which concentration it remained stable for months.

Example II

Commercial water glass having the composition $Na_2O(SiO_2)_{3.3}$ and containing 27 percent $SiO_2$ by weight was diluted with fully desalted water to give a concentration of 60 grams of $SiO_2$ per liter. One hundred and ten liters of the solution was passed at a flow velocity of 550 liters per hour through a rubber-lined tower containing 60 liters of an ion exchange resin in the hydrogen form, the solution being passed from the top to the bottom of the tower.

The ion exchange resin thus employed had previously been regenerated by treatment with 5 percent sulfuric acid and washed neutral with fully desalted water. The water initially obtained upon introducing the silicate solution was rejected until acid reaction occurred after about 4 minutes. Acid reaction yielded a silica sol having a pH between 2 and 3, which sol was collected in a 300-liter tank. After the addition of 110 liters of silicate solution (12 minutes), the silicate solution feed was stopped and fully desalted water was added to the column at the rate of 550 liters per hour in order to displace the silica sol therein. After about 8 minutes more the sol exiting from the column had a pH between about 3 and 4, approximately 73 liters of sol being collected in that time. The total sol solution collected was about 150 liters and contained approximately 5 percent $SiO_2$ by weight.

The ion exchange resin in the column was then washed with tap water, first by running the water from the top to the bottom of the column and then from the bottom to the top of the column. As soon as water running off was approximately neutral, the ion exchange resin was treated with a 5 percent sulfuric acid solution and regenerated.

Next, about 45 grams of barium carbonate suspended in water was added with stirring to the 150 liters of fresh sol. A sample of sol thus treated was filtered and tested for sulfate reaction. It showed none. Thereupon, the remaining sol, without previously filtering precipitated barium sulfate contained therein, was poured into a vessel provided with a stirrer.

As in Example I, the vessel provided with a stirrer contained hot substantially $SO_4^{--}$-free, fresh sol adjusted by means of NaOH to a pH between 8 and 9. Heating, evaporation, and pH control were effected as in Example I and, after several portions or batches had been treated in such fasion, the vessel contents were tested for $Ba^{++}$ and $SO_4^{--}$ ions. If barium ions were detected in the vessel mixture, an appropriate quantity of fresh sol which had not been treated with barium carbonate was added to the vessel contents to remove residual barium ions contained therein.

Subsequently, the almost $Ba^{++}$-free and substantially $SO_4^{--}$-free sol was evaporated to an $SiO_2$ content of 30 percent by weight. Next, the barium sulfate which had been coarsened by the evaporating process and other contaminants contained therein were removed by centrifuging. The resulting relatively pure silica sol was stable for an indefinite period of time.

It will be noted that the use of sulfuric acid for regenerating the ion exchange resin is advantageous, since any traces of regenerating acid left in the ion exchange column after washing are neutralized by the sulfate-precipitating additives of the present invention.

While the present invention has been described in detail as to particular embodiments thereof, it is not intended that these details exert any undue restrictions upon the scope of the invention.

We claim:

1. In the process of producing a stable silica sol by treating an aqueous alkali metal silicate solution containing sulfate as an impurity with an ion exchange resin in the hydrogen form to produce a silica sol, making the sol alkaline and concentrating the sol to a higher $SiO_2$ content above 15 percent $SiO_2$ by weight, the improvement comprising selectively precipitating the sulfate from the sol by adding a compound which is a member of the group consisting of barium carbonate, lead carbonate, and lead oxide, separating the resulting precipitate from the sol and then concentrating the sol.

2. The process of claim 1 wherein the only slightly water-soluble sulfate is removed from the sol in its acid state.

3. The process of claim 1 wherein the only slightly water-soluble sulfate is removed from the sol in its alkaline state.

4. The process of claim 1 wherein the only slightly water-soluble additive compound is barium carbonate.

5. The process of claim 1 wherein the only slightly water-soluble additive compound is lead carbonate.

6. The process of claim 1 wherein the only slightly water-soluble additive compound is a lead oxide.

7. In the process of producing a stable silica sol by treating an aqueous alkali metal silicate solution containing sulfate as an impurity with an ion exchange resin in the hydrogen form to produce a silica sol, making the sol alkaline and concentrating the sol to a higher $SiO_2$ content above 15 percent $SiO_2$ by weight, the improvement comprising selectively precipitating the sulfate from the sol by adding benzidine to the sol, separating the resulting precipitate from the sol and then concentrating the sol.

References Cited in the file of this patent

UNITED STATES PATENTS

| | | |
|---|---|---|
| 2,574,902 | Bechtold et al. | Nov. 13, 1951 |
| 2,605,228 | Alexander et al. | July 29, 1952 |